United States Patent [19]

Brady et al.

[11] Patent Number: 5,675,736
[45] Date of Patent: Oct. 7, 1997

[54] MULTI-NODE NETWORK WITH INTERNODE SWITCHING PERFORMED WITHIN PROCESSOR NODES, EACH NODE SEPARATELY PROCESSING DATA AND CONTROL MESSAGES

[75] Inventors: James Thomas Brady; Damon W. Finney, both of San Jose, Calif.; Michael Howard Hartung, Tucson, Ariz.; Paul Wayne Hunter; Michael Anthony Ko, both of San Jose, Calif.; Donald J. Lang, Cupertino, Calif.; Noah R. Mendelsohn, Lexington, Mass.; Jaishankar Moothedath Menon, San Jose; David Ronald Nowlen, Morgan Hill, both of Calif.

[73] Assignee: International Business Machines Corporation, Armonk, N.Y.

[21] Appl. No.: 685,770

[22] Filed: Jul. 24, 1996

Related U.S. Application Data

[63] Continuation of Ser. No. 448,901, May 24, 1995, abandoned.

[51] Int. Cl.⁶ .................................................. G06F 13/00
[52] U.S. Cl. .............................. 395/200.03; 395/200.01
[58] Field of Search ......................... 395/200.01, 200.15, 395/200.03, 200.07, 200.08, 441

[56] References Cited

U.S. PATENT DOCUMENTS

| | | | |
|---|---|---|---|
| 3,676,846 | 7/1972 | Busch | 340/146 |
| 4,380,046 | 4/1983 | Fung | 364/200 |
| 4,899,333 | 2/1990 | Roediger | 370/60 |
| 4,942,517 | 7/1990 | Cok | 364/200 |
| 5,088,091 | 2/1992 | Schroeder et al. | 370/94.3 |
| 5,105,424 | 4/1992 | Flaig et al. | 370/94 |
| 5,113,398 | 5/1992 | Howes | 371/11.2 |
| 5,117,420 | 5/1992 | Hillis et al. | 370/60 |
| 5,130,992 | 7/1992 | Frey, Jr. et al. | 371/401 |
| 5,170,393 | 12/1992 | Peterson et al. | 370/94.1 |
| 5,173,689 | 12/1992 | Kusano | 340/827 |
| 5,191,410 | 3/1993 | McCalley et al. | 358/86 |
| 5,218,676 | 6/1993 | Ben-Ayed | 395/200.15 |
| 5,230,047 | 7/1993 | Frey, Jr. et al. | 395/575 |
| 5,289,460 | 2/1994 | Drake, Jr. et al. | 370/17 |
| 5,293,377 | 3/1994 | Gould | 370/94.1 |

OTHER PUBLICATIONS

Microsoft Press, "Computer Dictionary 2nd Ed", 1994 p. 412

*Primary Examiner*—Mehmet B. Geckil
*Attorney, Agent, or Firm*—Ohlandt, Greeley, Ruggiero & Perle

[57] ABSTRACT

A distributed data processing system includes a plurality of nodes interconnected by bidirectional communication links. Each node includes a control message line for handling of control messages and a control memory for storing the control messages. Each node further includes data message line for handling of data messages and a data memory for storing the data messages. A processor in the node causes the data message line to queue and dispatch data messages from the data memory and the control message line to queue and dispatch control messages from the control memory. Each node includes N bidirectional communication links enabling the node to have at least twice as much input/output bandwidth as the control message line and data message line, combined. An input/output switch includes a routing processor and is coupled between the N bidirectional communication links, the data message line and control message line. The input/output switch dispatches either a control message or a data message over at least one of the bidirectional communication links in accordance with an output from the routing control processor, thereby enabling each communication link to carry either data or control messages. If a communication link is busy with either a control or a data message, the routing control processor increments to another communication link to enable dispatch of a queued message.

10 Claims, 5 Drawing Sheets

I/O SWITCH 42

MULTI-NODE NETWORK WITH INTERNODE SWITCHING PERFORMED WITHIN PROCESSOR NODES, EACH NODE SEPARATELY PROCESSING DATA AND CONTROL MESSAGES

This is a continuation of application Ser. No. 08/448,901 filed on May 24, 1995 now abandoned.

FIELD OF THE INVENTION

This invention relates to a multi-node network that employs distributed switching of inter-node communication links and, more particularly, to a multi-node network wherein control and data messages are handled along separate paths within nodes.

BACKGROUND OF THE INVENTION

With the availability of low cost microprocessors, distributed, multi-node data processors have come into vogue. Such systems include multiple nodes, each node including a microprocessor. In certain systems, the nodes are interconnected by fixed circuits—and in others, the nodes are interconnected via centralized switches. Such systems are often applied to solution of large problems wherein each node operates, in parallel, upon a different portion of the problem, and the results are combined in an output node. Other multi-node systems are used to configure control functions, such as controllers for disk drive memories. In such systems, data transfers generally consist of long data messages which include data from multiple tracks of a disk drive. Control messages between nodes in such a system are relatively short. Control logic is provided in the respective nodes to enable dispatch of control messages, notwithstanding the long data messages. However, within such nodes, both data and communication messages are handled through common input/output (I/O) ports which often causes undue delay in the processing of control messages.

The prior art describes a number of techniques for routing of data and control messages between nodes in a network. In U.S. Pat. No. 5,105,424 to Flaig et al., a distributed internode message routing system is described wherein each node has separate routing control circuitry for each dimension of the network. In the Flaig et al. system, each node adds routing directions to a message packet, dependent upon the next destination of the packet. Each packet is then dispatched by the routing circuitry to a next adjacent node on route to a destination node. At each node interface, a memory map is stored of locations of other nodes in the system and a corresponding route to each node. The routing circuitry accesses the stored memory map to determine route information to be added to the message packet.

U.S. Pat. No. 3,676,846 to Busch describes a centralized message buffering system. Messages from low speed sources are buffered in a peripheral computer which temporarily stores the incoming data and arranges it into strings of data blocks. The strings are then transmitted as messages at a high data transfer rate to a central host computer. U.S. Pat. No. 4,380,046 to Fung describes a massively parallel processor system wherein parallel data is processed and a bidirectional data bus is employed to enable data transfers between individual processors.

U.S. Pat. No. 5,117,420 to Hillis et al. describes a routing technique for message packets wherein it is initially determined if a message packet is addressed to a processing node associated with the router. If not, the router directs the message packets to their destination, if possible, or otherwise stores the messages packets that cannot be routed because of circuit conflicts. The router is also able to merge message packets addressed to a same destination and to also broadcast message packets selectively to certain processor nodes in the nodal array. U.S. Pat. No. 4,942,517 to Cok describes a torus-like, distributed-memory, parallel computer having rows of processors, with each processor having an independent memory. A common input/output channel is adapted to be connected to a single row of processors by a buffer associated with each processor in a row.

Notwithstanding the multiplicity of network interconnection schemes in the prior art, none address in a satisfactory manner the problem that occurs when long data messages are transmitted and prevent transmission of control messages for the duration of the transmission. Further, within individual nodes of the network, it is vital that control messages be processed expeditiously without having to await the processing of data messages.

Accordingly, it is an object of this invention to provide a multi-nodal data processing system with an improved capability for handling data and control messages.

It is another object of this invention to provide an improved multi-nodal data processing system which is configured to enable expeditious dispatch of control messages—even in the presence of long duration data messages.

It is yet another object of this invention to provide a multi-nodal data processing system wherein message routing circuitry is operable independently of a node's processor, thereby enabling intra-node processing to continue even while handling message transfers.

SUMMARY OF THE INVENTION

A distributed data processing system includes a plurality of nodes interconnected by bidirectional communication links. Each node includes control message line for handling of control messages and a control memory for storing the control messages. Each node further includes a data message line for handling of data messages and a data memory for storing the data messages. A processor in the node causes the data message line to queue and dispatch data messages from the data memory and the control message line to queue and; dispatch control messages from the control memory. Each node includes N bidirectional communication links enabling the node to have at least twice as much input/output bandwidth as the control message line and data message line, combined. An input/output switch includes a routing processor and is coupled between the N bidirectional communication links, the data message line and control message line. The input/output switch dispatches either a control message or a data message over at least one of the bidirectional communication links in accordance with an output from the routing control processor, thereby enabling each communication link to carry either data or control messages. If a communication link is busy with either a control or a data message, the routing control processor increments to another communication link to enable dispatch of a queued message.

DETAILED DESCRIPTION OF THE INVENTION

Figure 1:
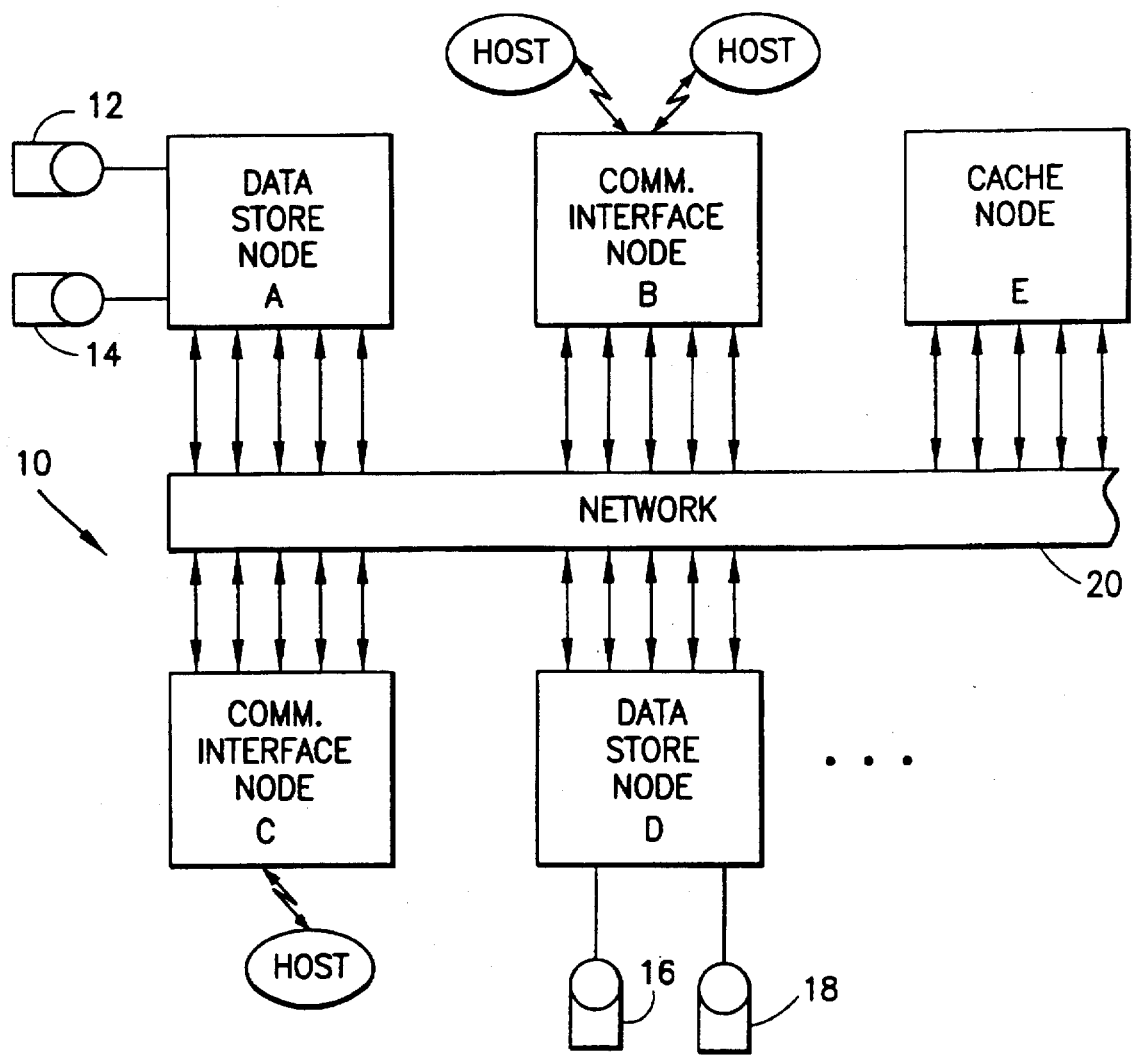
FIG. 1 is a block diagram of a multi-node network that implements the invention hereof.

The block diagram of FIG. 1 illustrates a multi-node network 10 configured as a disk drive controller array. Nodes A and D are data storage nodes that connect to coupled disk drives 12, 14 and 16, 18, respectively. A pair of communication interface nodes B and C provide input/output functions to coupled host processors which make use of the data storage facilities of the multi-node network. A cache node E provides temporary storage facilities for both input and output of data transfer functions between network 10 and one or more of the host processors. Multi-node network 10 is expandable by addition of further nodes, all of which are interconnected by an internal communication network 20.

Figure 2:
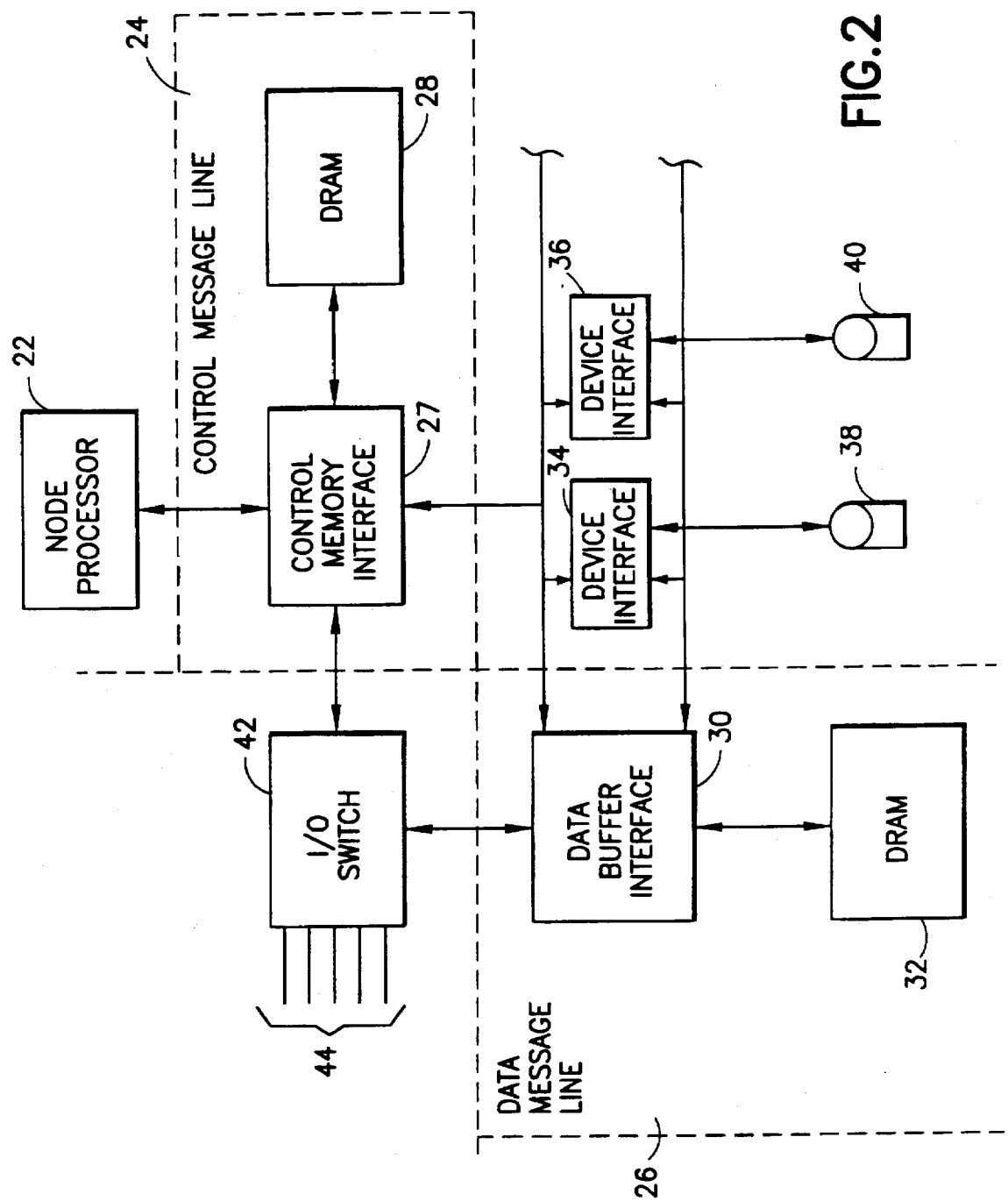
FIG. 2 is a block diagram of a representative node.

Each of nodes A-E is configured from a common node arrangement shown in FIG. 2. Each node includes a node processor 22 that controls the overall functions of the node. Each node further includes a control message "line" 24 for receiving, storing and dispatching control messages and a data message "line" 26 for receiving, storing and dispatching data messages. Control message line 24 comprises a control memory interface module 27 and a dynamic random access memory (DRAM) 28. Each data message line 26 includes a data buffer interface module 30 and a DRAM 32. Data buffer interface module 30 connects to a plurality of device interfaces 34, 36, etc. which, in turn, provide interfaces to associated disk drives 38, 40, etc. Control messages originating from control memory interface 26, processor 22, etc. enable control of various node actions.

If the node of FIG. 2 is utilized as a cache node, random access memory 32 in data message line 26 is larger in size than if the node is configured as a communication interface node or a data storage node. If the node is configured as a communication interface node, communication adapters are included (not shown) which enable connection to external host processor.

As will become apparent from the description below, the architecture of multi-node network 10 is configured to efficiently handle both long data messages that characteristically occur from/to disk drives and a multiplicity of small control messages which are required to enable operation of the network and individual nodes. Within each node, the respective control and data message lines enable segregation of control and data messages and allow their independent processing and transfer to an input/output switch 42 which is provided in each node. I/O switch 42 includes apparatus which enables it to independently switch messages that arrive on one or more of input links 44 and are destined for another node. Each node is preferably provided with at least twice as many communication links 44 as there are lines, so as to provide each node with at least twice the communication bandwidth that is present within the node.

Each of communication links 44 is connected to another node, thereby enabling messages to either be directly routed to a connected node or to be routed through a connected node to another node, as the case may be. I/O switch 42 can direct messages from any communication link 44 to any other communication link 44. I/O switch 42 is further able to select, dynamically, the best communication link 46 to use, given a current state of the various links. Each of communication links 44 is independent and is usable for either data or control messages.

The described node structure enables a distributed network to be configured wherein all message switching functions are distributed throughout the nodes and eliminates a need for centralized switching control. It is only within a node that control and data messages are segregated and handled substantially independently. Each I/O switch 42 handles control and data messages in the same manner. Further, the multiple inter nodal links provide the system with a high level of robustness and redundancy in the event of a failure of one or a few nodes.

Figure 3:
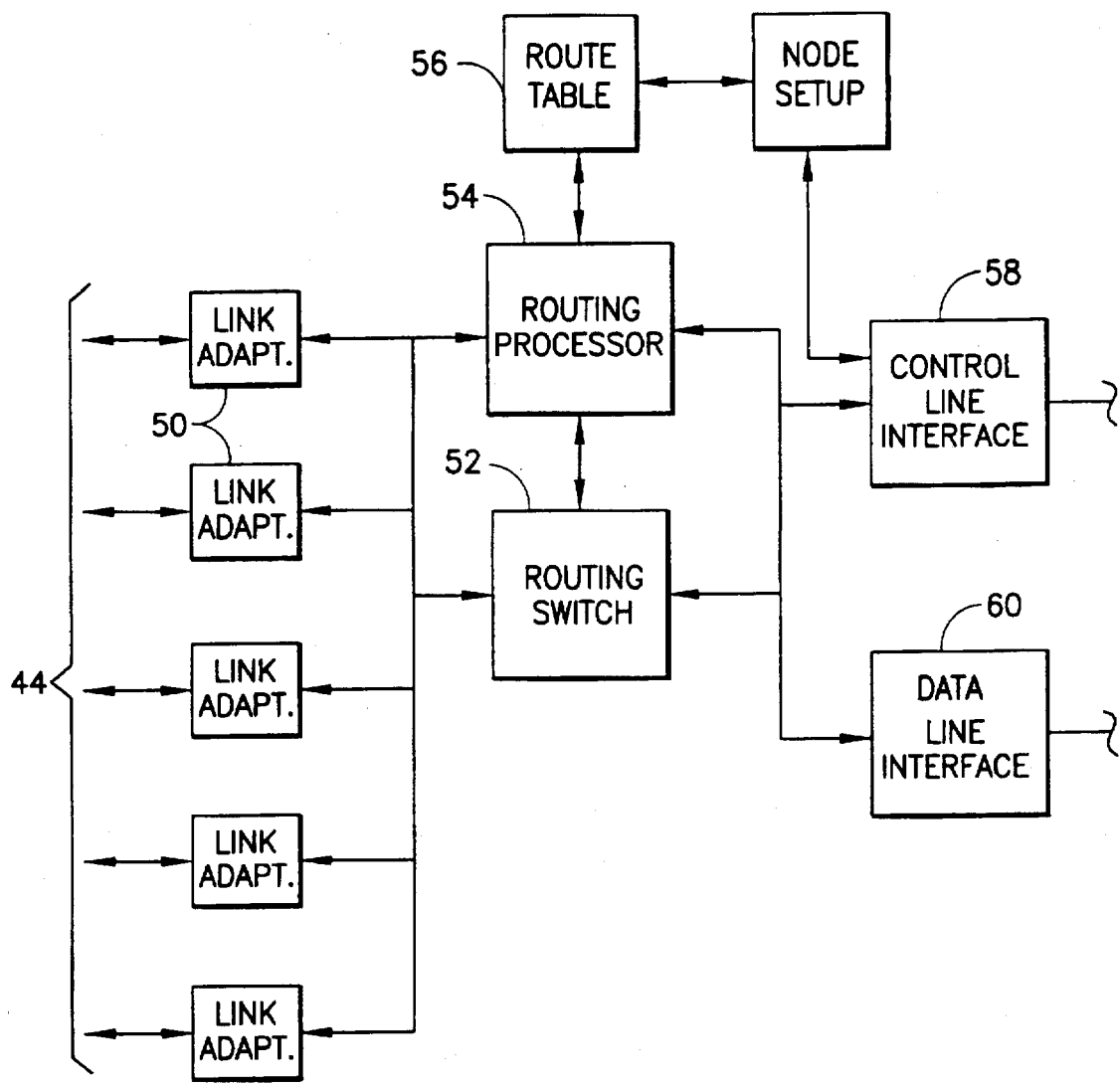
FIG. 3 is a block diagram of an I/O switch employed in the node of FIG. 2.

Referring now to FIG. 3, a block diagram illustrates further details of I/O switch 42. Each of communication links 44 is bi-directional and interfaces with a link adapter 50. Note that there are five link adapters shown, each of which enables full duplex communication with another node. Each link adaptor 50 is preferably a 100 megabyte/second, full duplex transceiver and includes small first-in/first-out buffers to handle asynchronously clocked data from either routing switch 52 or from another node connected via a communication link 44.

A routing processor 54, in the case of outgoing messages, accepts a destination address from either control message line interface 58 or data message line interface 60. In response, routing processor 54 accesses route table 56, examines the state of routing switch 52 and then selects an optimal link adapter 50 for transmission of the message (if the message is destined to a different node). If the message is for this node, routing processor 54 selects either the control or buffer lines, as the case may be. If routing processor 54 finds that all links are busy, a busy indication is returned to node processor 22.

I/O switch 42 further includes a node set up circuit that is coupled to control message line interface 58 and is employed to initialize I/O switch 42 and to read out status information therefrom. The primary set up function is the initialization of route table 56. Route table 56 has an individual entry for every possible node address. Each node address entry further specifies a primary link adapter as being the shortest path to the node address and three alternate link adapters in case the primary link adapter is not available. When a message is routed through an intermediate node and the primary communication path is not selected, routing processor 54 selects the next alternate link adapter, until an available link adapter is found or none are found, in which case an interrupt is generated, in the node which originated the message.

When either a control message appears in control message line interface 58 or a data message appears in data message line interface 60, routing processor 54 examines the destination address and routes the message through an available link adapter, in accordance with entries in route table 56 and busy/available information from routing switch 52. Note, that within I/O switch 42, data and control messages are handled identically as independent messages that are ready for transfer. Because I/O switch 42 includes at least twice as much bandwidth as is available on both the control and buffer message line, message transfers are accomplished without undue delay. Thus, control messages are dispatched without having to wait for the completion of a very long data message which may be in the process of transmission (or reception).

Routing processor 54 preferably accepts messages from either control message line interface 58 or data message line interface 60 in dependence upon whichever interface first indicates a message available for transmission. If a "tie" occurs between a control and data message, routing processor 54 will preferably transmit the control message first—it being a very short message when compared to the data message.

Routing switch 52 is a conventional 7×7 non blocking circuit switch which enable communication between any of link adapters 50, control message line interface 58 and data message line interface 60. Routing processor 54 is adapted to transmit a message via routing switch 52 to one or more link adapters 50. Routing processor 54, in response to a value (or values) present in a message's header, enables assignment of either a single link adapter to the message or multiple link adapters, so as to accomplish a "wavefront" type message routing. Note that for any message received via a link adapter 50 that is directed to yet another node, routing processor 54 is able to accomplish a rerouting of that message without requiring access to or an interrupt to be generated within node processor 22. In such manner, message routing within the multi-node network is substantially accomplished without interaction of node processor 22—thereby enabling each node's processor 22 to concentrate its activities on internal node functions.

Figure 4:
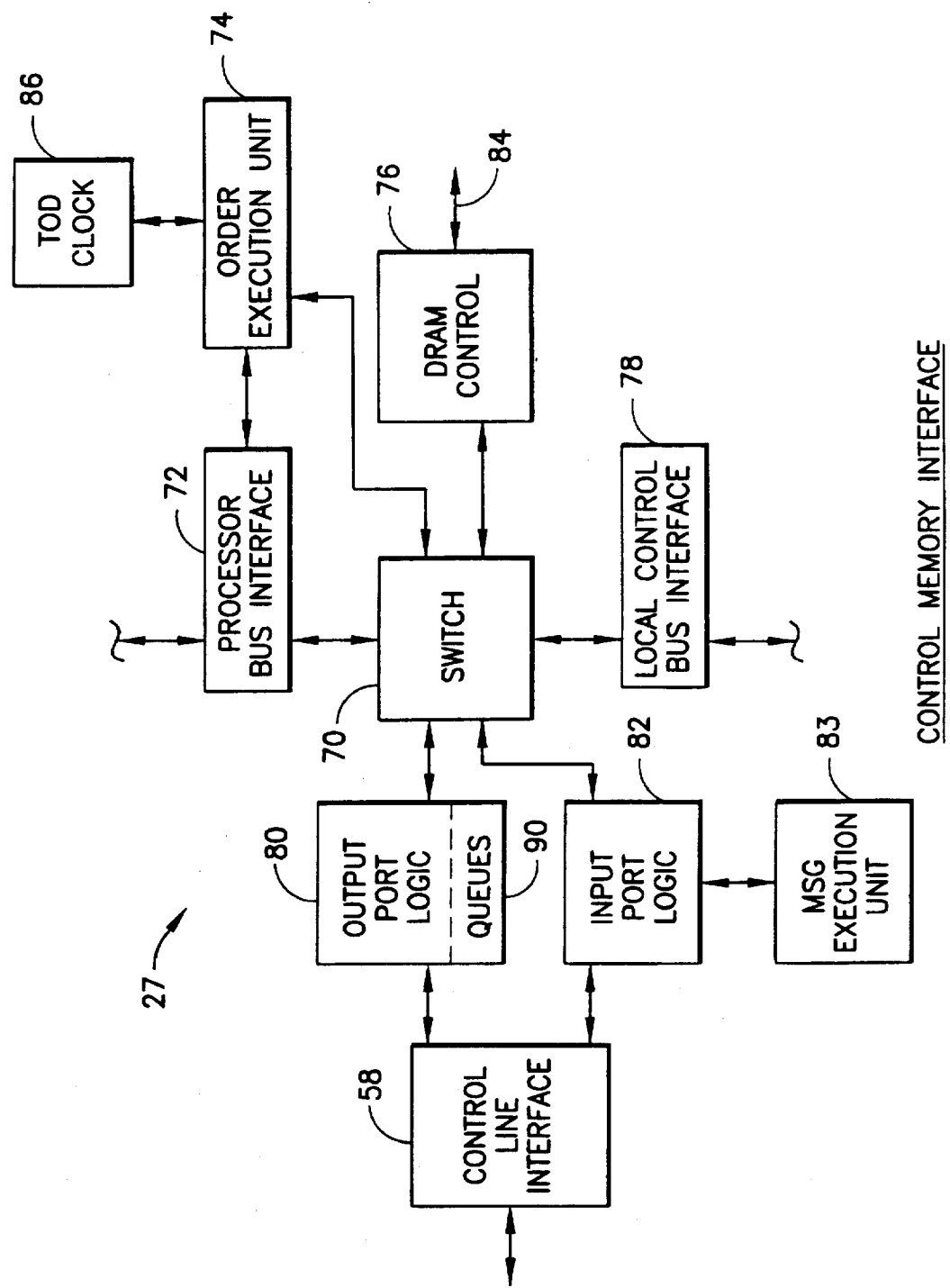
FIG. 4 is a block diagram of the control memory interface block contained in the node of FIG. 2.

Referring to FIG. 4, further details are shown of control memory interface module 27. A switch 70 enables communication between various of the functionalities within control memory interface module 27. These are a processor bus interface 72, an order execution unit 74, a DRAM controller 76, a local control bus interface 78, output port logic 80 and input port logic 82. DRAM controller 76 enables attachment of a random access memory 28 via an operand memory bus 84.

Processor bus interface 72 is an interface to node processor 22 and provides a path that enables memory fetches and stores. Order execution unit 74 interprets, fetches and stores data to certain memory-registers as orders to be executed. Some but not all orders are executed in this unit. A description of certain of the orders will be found below. In essence, order execution unit 32 enables expedited handling of certain orders, without specific involvement of node processor 22.

A time-of-day clock 86 includes both a clock incrementer and clock comparator (not shown). Each time-of-day clock 86 in each node is periodically resynchronized with time of day clocks in other nodes. Order execution unit 74 provides the facilities to set, read out and otherwise control time-of-day clock 86.

Local control bus interface 78 enables access between node processor 22 and data buffer interface 30 (FIG. 1) and the various device interfaces 34, 36 ... that are connected to data buffer interface 30. Node processor 22, via local control bus 78 is able to perform a number of functions, i.e., fetch and store to data memory 32; issuance of orders to one or more device interfaces 34, 36; transfer of data from control message line 24 to data message line 26 and vice versa, etc.

Output port logic 80 includes a plurality of queues 90 wherein messages of various levels of priority are queued, awaiting transmission. Output port logic 80 attempts to transmit each message in a highest priority queue before proceeding to a next lower priority queue. A message can be sent from output port logic 80 to input port logic 82 via control message line interface 58 of the same node, but such messages are normally sent to other nodes via I/O switch 42.

Input port logic 82 receives control messages from control message line interface 58 and briefly buffers them. It decodes the control messages according to class (i.e., hardware executed or processor executed), and hardware executed messages are forwarded to message execution unit 83 where they are executed. Processor executed messages are received into memory addresses within DRAM 28 in a logical input data structure that corresponds to a function required by code in a received control message header. At some later time, the function is executed.

Figure 5:
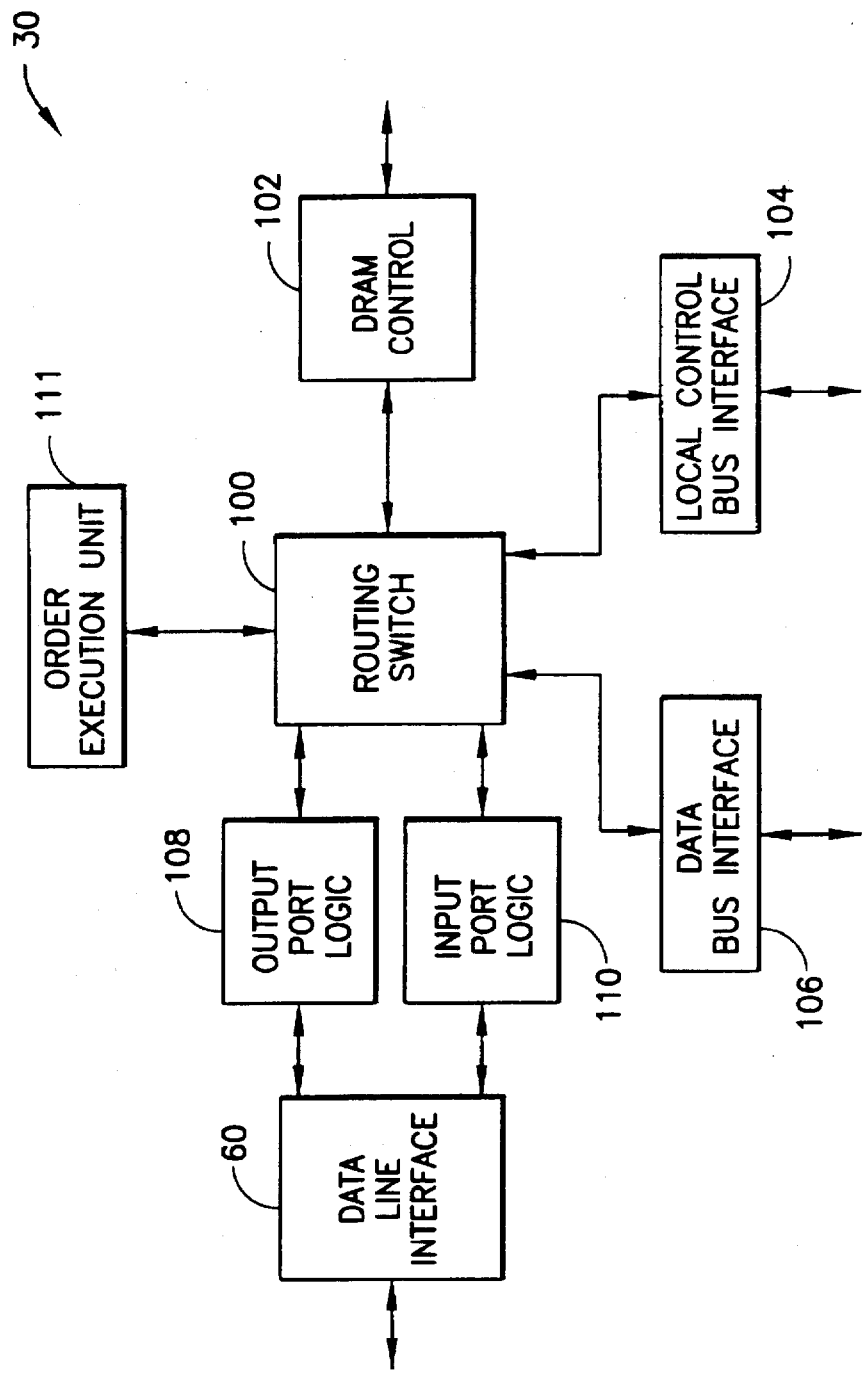
FIG. 5 is a block diagram of the data buffer interface block of the node of FIG. 2.

Referring to FIG. 5, details of data buffer interface module 30 will be described. Structurally, it is similar to control memory interface module 27 but does not include a time-of-day clock, a message execution unit or a processor bus interface. Data buffer interface module 30 is constructed around a switch 100 which enables communication between the various connected functionalities. A DRAM controller 102 enables access to data memory 32. Local control bus interface 104 interconnects to control memory interface module 27 to enable receipt and transfer of control messages. Data bus interface 106 enables access to and from device interface modules 34, 36 and their respectively connected disk drives. Output port logic module 108 and input port logic module 110 are constructed in much the same fashion as the output/input port logic modules of control memory interface 27, however, the data structures processed therein are more complex. Order execution unit 110 executes hardware executed messages related to data message line functions.

As a result of the above described control and data message line structures, control messages and data messages are handled substantially independently. This enables long data messages to be queued and transmitted while control messages are processed and readied for transmission in a concurrent fashion. As a result, there is no need to preempt the processing of long data messages for control messages. Such preemption requires substantial state saving, loading and reloading and constitutes a significant processing overhead for data messages. For example, in transfer of a data message from a disk drive, the transfer of the data message between nodes would be preempted at least five times by associated control messages. This would substantially reduce the effective bandwidth of the message.

Further, the system enables use of indefinitely long message lengths and thus departs from prior art packet-type switching systems which segregate messages into specific message segment lengths (to enable insertion of control message packets). The indefinitely long data message length is accomplished by allowing multiple fields of a message to be concatenated into a single message. Each field includes a delimiter specifying its length and a cyclic redundancy check character following it. This allows data to be transmitted in one message without exceeding the error detection strength of the CRC character.

Control messages are preferably sub-divided into two classes. A control message is decoded as to class within input port logic module 82. One class is messages that must be processed by the node's processor and the other class is those messages which may be processed within the node's hardware without requiring intervention of the node's processor. The latter class of messages comprise lock messages and state extraction control messages. The lock messages allow one node to acquire or release one or more locks in another node without involving the processor in that node. This reduces response time and overhead for acquiring a lock by a factor of at least two and allows the requesting node to manipulate the lock synchronously, i.e., without dispatching another task, and substantially improves the responsiveness of the system.

State acquisition messages are messages which allow one node to extract state information from another node without involving that node's processor. An example of such a message is a control message that causes read out of a portion of data stored in a node's memory and sends it back to the requesting node. Such a message is processed directly in order execution unit 74 within memory interface 26. One such command is a "read destination address" which causes a fetching of data from a memory location in the destination node. The message body comprises a multi-byte memory address and when the message is received at the destination node, order execution unit 74 in the destination node writes the data from the control message's body into the memory location specified in the message body. Redispatch of the message conveys the accessed data to the requesting mode. Another control message is a "write multiple" message wherein any number of data words are stored in consecutive memory locations. The control message's body consists of a memory address and one or more data words to be written, starting at the memory address.

It should be understood that the foregoing description is only illustrative of the invention. Various alternatives and modifications can be devised by those skilled in the art without departing from the invention. For instance, while in FIG. 2, DRAM memories 28 and 32 are shown as separate modules, in a physical implementation they would preferably be configured as two portions of a unitary memory module. Further, the functions of control memory interface 27 and data buffer interface 30 are preferably combined into a unitary interface module. Accordingly, the present invention is intended to embrace all such alternatives, modifications and variances which fall within the scope of the appended claims.

What is claimed is:

1. A distributed data processing system configured as a disk drive controller array, comprising:

a plurality of disk drive controller nodes, each disk drive controller node directly connected to each of N other nodes via a bi-directional communication link, where N>=4, each said node thereby having at least twice as much input/output bandwidth as internal message handling bandwidth, each disk drive controller node further comprising:

control message means for substantially independent handling of control messages;

control memory means coupled to said control message means for storing control messages;

disk drive means;

data message means for substantially independent handling of data messages;

data memory means coupled to said data message means for storing data messages to and from said disk drive means;

processor means coupled to each of the aforesaid means, for causing said data message means to assemble, queue and dispatch data messages from said data memory means and said control message means to assemble, queue and dispatch control messages from said control memory means, said data messages generally being substantially longer than said control messages; and input/output (I/O) switch means coupled between said N bi-directional communication links and said data message means and control message means and including routing control means, for utilizing said N bidirectional communication links to enable concurrent dispatch of control messages and data messages in accord with outputs from said routing control means, said I/O switch means employing said N bidirectional communication links to enable dispatch of said control messages, without requiring delay thereof pending completion of dispatch of said data messages.

2. The distributed data processing system as recited in claim 1, wherein said routing control means is responsive to a message received via a bidirectional communication link, which message is addressed to another node, to direct said message to said another node without involving an operation of said processor means.

3. The distributed data processing system as recited in claim 1, wherein said I/O switch means dispatches data messages and control messages in an order received from said data message means and control message means, respectively, and in a case when a data message and control message are received substantially simultaneously, dispatches said control message before said data message.

4. The distributed data processing system as recited in claim 1, wherein said routing control means comprises:

table means including an entry for each destination node, said entry specifying a primary bidirectional communication link to be allocated for messages addressed said destination node and plural alternate bidirectional communication links to be employed in case said primary bidirectional communication link is busy.

5. The distributed data processing system as recited in claim 1, wherein each address appended to a message for said destination node includes a value employed by said routing control means to determine whether said message to said destination node is to be transmitted over just one or plural ones of said bi-directional communication links.

6. The distributed data processing system as recited in claim 4, wherein said routing control means includes control means responsive to received message address header information to determine if said information indicates another node, and if yes, to access an entry in said table means corresponding to said information and to enable dispatch of said message, all without involvement of said processor means.

7. The distributed data processing system as recited in claim 1, wherein said processor means controls said data message means and data memory means to assemble indefinitely long data messages with interspersed cyclic redundancy codes (CRC) for error checking, each said CRC positioned at a position in said indefinitely along data messages which is within an error detection capability of said CRC, an indefinitely long data message comprising header information followed by data as read from a track or tracks of a disk drive.

8. The distributed data processing system as recited in claim 1, further comprising:

means in said control message means for determining whether a received control message is a first type to be processed by said processor means or a second type to be processed by an order execution unit; and an order execution unit for receiving second type control messages and for performing an operation required by said second type control message without intervention of said processor means.

9. The distributed data processing system as recited in claim 8, wherein said second type control message requests a state report and said order execution unit retrieves a state value, inserts said state value into a response control message and dispatches said response control message.

10. The distributed data processing system as recited in claim 1, wherein said control memory means and data memory means comprise two portions of a unitary random access memory.

* * * * *